US010101914B2

(12) United States Patent
Tan et al.

(10) Patent No.: US 10,101,914 B2
(45) Date of Patent: Oct. 16, 2018

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventors: Kok-Yong Tan, Miaoli County (TW); Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 285 days.

(21) Appl. No.: 15/093,755

(22) Filed: Apr. 8, 2016

(65) Prior Publication Data

US 2017/0228162 A1    Aug. 10, 2017

(30) Foreign Application Priority Data

Feb. 5, 2016   (TW) .............................. 105104043 A

(51) Int. Cl.
*G06F 12/02*    (2006.01)
*G06F 3/06*    (2006.01)

(52) U.S. Cl.
CPC .......... *G06F 3/0605* (2013.01); *G06F 3/0652* (2013.01); *G06F 3/0659* (2013.01); *G06F 3/0665* (2013.01); *G06F 3/0679* (2013.01); *G06F 12/0246* (2013.01); *G06F 2212/214* (2013.01); *G06F 2212/657* (2013.01); *G06F 2212/7201* (2013.01)

(58) Field of Classification Search
CPC .... G06F 3/0605; G06F 3/0652; G06F 3/0659; G06F 3/0665; G06F 12/00; G06F 12/02
See application file for complete search history.

(56) References Cited

U.S. PATENT DOCUMENTS

| 7,996,642 | B1 * | 8/2011 | Smith | ................. | G06F 12/0246 |
|---|---|---|---|---|---|
| | | | | | 711/154 |
| 2009/0125668 | A1 * | 5/2009 | Huhne | ................. | G06F 12/0246 |
| | | | | | 711/103 |
| 2011/0029723 | A1 * | 2/2011 | Lee | ................... | G06K 19/07732 |
| | | | | | 711/103 |
| 2013/0246722 | A1 * | 9/2013 | Suzuki | ................... | G06F 3/0608 |
| | | | | | 711/162 |
| 2013/0246732 | A1 * | 9/2013 | Seng | ................... | G06F 12/0246 |
| | | | | | 711/203 |

* cited by examiner

*Primary Examiner* — Tuan Thai
(74) *Attorney, Agent, or Firm* — JCIPRNET

(57) ABSTRACT

A memory management method for a rewritable non-volatile memory module is provided. The memory management method includes receiving an adjust command from a host system, wherein the adjust command is configured to indicate that data stored in at least one logical unit of a plurality of logical units is invalid; updating a logical address status table according to the adjust command, wherein the logical address status table reflects a data status of the data stored in each of the logical units, wherein the data status includes a first state or a second state; and updating a physical address status table according to the logical address status table and the physical address status table if a predetermined condition is met, wherein the physical address status table reflects a data status of data stored in each of a plurality of physical programming units.

27 Claims, 9 Drawing Sheets

Logical-to-Physical address mapping table — 820

| A | 801(0) | 901(7) |
|---|--------|--------|
| B | 801(1) | 901(3) |
| C | 801(2) | 901(4) |
| D | 801(3) | 901(5) |
| E | 801(4) | 901(2) |
| F | 801(5) | 901(1) |
| G | 801(6) | 901(6) |
| H | 801(7) | 901(0) |

Physical-to-Logical address mapping table — 830

| a | 901(0) | 801(7) |
|---|--------|--------|
| b | 901(1) | 801(5) |
| c | 901(2) | 801(4) |
| d | 901(3) | 801(1) |
| e | 901(4) | 801(2) |
| f | 901(5) | 801(3) |
| g | 901(6) | 801(6) |
| h | 901(7) | 801(0) |

| 801(0) | "1" | ~802(0) |
| 801(1) | "1" | ~802(1) |
| 801(2) | "1" | ~802(2) |
| 801(3) | "1" | ~802(3) |
| 801(4) | "1" | ~802(4) |
| 801(5) | "1" | ~802(5) |
| 801(6) | "1" | ~802(6) |
| 801(7) | "1" | ~802(7) |

Logical address status table

921

| 801(0) | "0" | ~802(0) |
| 801(1) | "0" | ~802(1) |
| 801(2) | "1" | ~802(2) |
| 801(3) | "1" | ~802(3) |
| 801(4) | "1" | ~802(4) |
| 801(5) | "1" | ~802(5) |
| 801(6) | "1" | ~802(6) |
| 801(7) | "1" | ~802(7) |

Logical address status table

FIG. 9

| | | |
|---|---|---|
| 901(0) | "0" | ~902(0) |
| 901(1) | "0" | ~902(1) |
| 901(2) | "0" | ~902(2) |
| 901(3) | "1" | ~902(3) |
| 901(4) | "1" | ~902(4) |
| 901(5) | "1" | ~902(5) |
| 901(6) | "1" | ~902(6) |
| 901(7) | "1" | ~902(7) |

1010

Physical address status table

| | | | |
|---|---|---|---|
| 901(0) | 902(0) "0" | "1" | ~1001(0) |
| 901(1) | 902(1) "0" | "2" | ~1001(1) |
| 901(2) | 902(2) "0" | "3" | ~1001(2) |
| 901(3) | 902(3) "1" | "4" | ~1001(3) |
| 901(4) | 902(4) "1" | "5" | ~1001(4) |
| 901(5) | 902(5) "1" | "6" | ~1001(5) |
| 901(6) | 902(6) "1" | "7" | ~1001(6) |
| 901(7) | 902(7) "1" | "8" | ~1001(7) |

1020

Physical address status table

FIG. 10

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 105104043, filed on Feb. 5, 2016. The entirety of the above-mentioned patent application is hereby incorporated by reference herein and made a part of this specification.

BACKGROUND OF THE INVENTION

Field of the Invention

The invention relates to a memory management method and more particularly relates to a memory management method for a rewritable non-volatile memory, a memory control circuit unit and a memory storage device.

Description of Related Art

Digital cameras, mobile phones, and MP3 players have undergone rapid growth in recent years, so that consumers' demands for storage media have also increased drastically. Since a rewritable non-volatile memory is characterized by non-volatility of data, the low power consumption, the small volume, the non-mechanical structure, and the fast reading and writing speed, the rewritable non-volatile memory is the most suitable in these electronic products. Therefore, the flash memory industry has become a very popular part of the electronic industry in recent years. For example, an embedded multi-media card (eMMC) widely used in portable electronic devices is a storage device using flash memory as a storage media.

Generally, a host system can transmit an adjust command to a storage device using a rewritable non-volatile memory (such as a solid state drive) to inform the storage device to eliminate data block no longer needed in the storage device so as to increase usable space. However, in order to response to the adjust command, the storage device is required to additionally consume resources and time to process the adjust command. Therefore, how to save time consumed for processing the adjust command so as to maximize the effect of the adjust command is an objective to which persons skilled in the art are committed.

SUMMARY OF THE INVENTION

The invention provides a memory management method, a memory control circuit unit and a memory storage device, capable of effectively saving time for processing an adjust command.

An exemplary embodiment of the invention provides a memory management method for a rewritable non-volatile memory module, wherein the rewritable non-volatile memory module includes a plurality of physical erasing units, wherein each of the plurality of physical erasing units has a plurality of physical programming units, wherein the plurality of physical programming units are mapping to a plurality of logical units. The memory management method includes receiving an adjust command from a host system, wherein the adjust command is configured to indicate that data stored in at least one logical unit among the plurality of logical units is invalid; updating a logical address status table according to the adjust command, wherein the logical address status table is configured to reflect a data status of the data stored in each of the plurality of logical units, wherein the data status includes a first state or a second state; updating a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units; and performing erasing to at least one invalid data according to the updated physical address status table.

An exemplary embodiment of the invention provides a memory control circuit unit for controlling a memory storage device. The memory control circuit unit includes a host interface, a memory interface and a memory management circuit. The host interface is coupled to a host system. The memory interface is coupled to the rewritable non-volatile memory module, wherein the rewritable non-volatile memory module includes a plurality of physical erasing units, wherein each of the plurality of physical erasing units has a plurality of physical programming units, wherein the plurality of physical programming units are mapping to a plurality of logical units. The memory management circuit is coupled to the host interface and the memory interface. The memory management circuit is configured to receive an adjust command from the host system, wherein the adjust command is configured to indicate that data stored in at least one logical unit of the plurality of logical units is invalid. The memory management circuit is further configured to update a logical address status table according to the adjust command, wherein the logical address status table is configured to reflect a data status of the data stored in each of the plurality of logical units, wherein the data status includes a first state or a second state. The memory management circuit is further configured to update a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units. In addition, the memory management circuit is further configured to perform erasing to at least one invalid data according to the updated physical address status table.

An exemplary embodiment of the invention provides a memory storage device including a connection interface unit, a host system, a rewritable non-volatile memory module and a memory control circuit unit. The connection interface unit is coupled to the host system. The rewritable non-volatile memory module includes a plurality of physical erasing units, wherein each of the plurality of physical erasing units has a plurality of physical programming units, wherein the plurality of physical programming units are mapping to a plurality of logical units. The memory control circuit unit is coupled to the connection interface unit and the rewritable non-volatile memory module. The memory control circuit unit is configured to receive an adjust command from the host system, wherein the adjust command is configured to indicate that data stored in at least one logical unit of the plurality of logical units is invalid. The memory control circuit unit is further configured to update a logical address status table according to the adjust command, wherein the logical address status table is configured to reflect a data status of the data stored in each of the plurality of logical units, wherein the data status includes a first state or a second state. The memory control circuit unit is further configured to update a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units, wherein the memory control circuit unit is further configured to perform erasing to at least one invalid data according to the updated physical address status table.

Accordingly, the memory management method, the memory control circuit unit and the memory storage device provided in the exemplary embodiments of the invention update the logical address status table according to the adjust command received, and updates the physical address status table according to the updated logical address status table when the system is idle, so as to reduce time consumed for processing the adjust command, thereby enhancing work efficiency.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 8 is a schematic diagram illustrating a logical-to-physical address mapping table and a physical-to-logical address mapping table according to an exemplary embodiment of the invention.

FIG. 9 is a schematic diagram illustrating updating a logical address status table according to an adjust command according to an exemplary embodiment of the invention.

FIG. 10 is a schematic diagram illustrating a physical address status table according to an exemplary embodiment of the invention.

DESCRIPTION OF THE EMBODIMENTS

Figure 1:
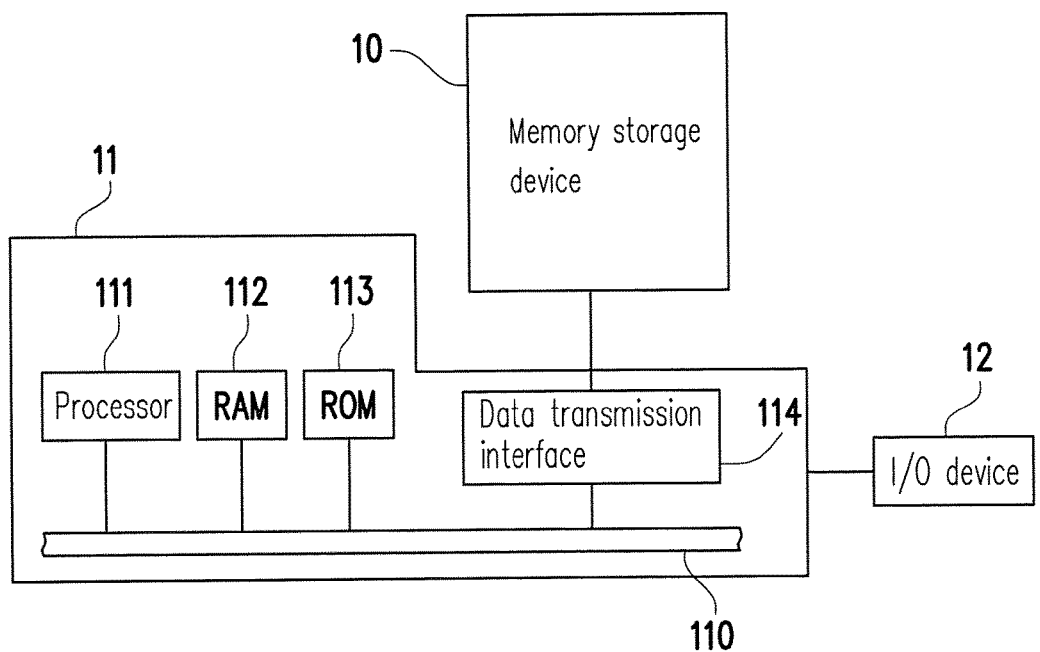
FIG. 1 is a schematic diagram illustrating a host system, a memory storage device, and an input/output (I/O) device according to an exemplary embodiment of the invention.
Figure 2:
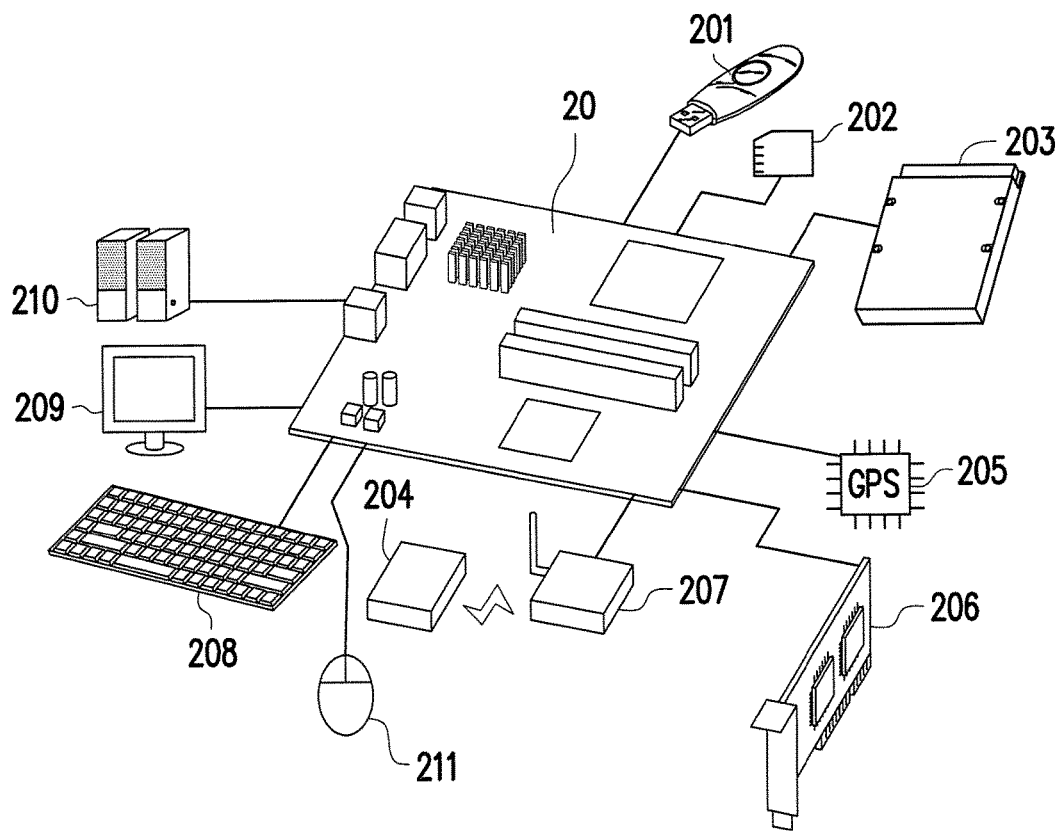
FIG. 2 is a schematic diagram illustrating a host system, a memory storage device, and an I/O device according to another exemplary embodiment of the invention.

FIG. 1 is a schematic diagram illustrating a host system, a memory storage device, and an input/output (I/O) device according to an exemplary embodiment of the invention. FIG. 2 is a schematic diagram illustrating a host system, a memory storage device, and an I/O device according to another exemplary embodiment of the invention.

Referring to FIG. 1 and FIG. 2, a host system 11 generally includes a processor 111, a random access memory (RAM) 112, a read-only memory (ROM) 113, and a data transmission interface 114. The processor 111, the RAM 112, the ROM 113, and the data transmission interface 114 are all coupled to a system bus 110.

In the exemplary embodiment, the host system 11 is coupled to the memory storage device 10 through the data transmission interface 114. For example, through the data transmission interface 114, the host system 11 writes data into the memory storage device 10 or reads data from the memory storage device 10. Furthermore, the host system 11 is coupled to the I/O device 12 through the system bus 110. For example, the host system 11 transmits an output signal to the I/O device 12 or receives an input signal from the I/O device 12 through the system bus 110.

In the exemplary embodiment, the processor 111, the RAM 112, the ROM 113, and the data transmission interface 114 may be disposed on a motherboard 20 of the host system 11. The number of the data transmission interface 114 can be one or more. Through the data transmission interface 114, the motherboard 20 is coupled to the memory storage device 10 via wired or wireless mode. The memory storage device 10 is, for example, a flash drive 201, a memory card 202, a solid state drive (SSD) 203, or a wireless memory storage device 204. The wireless memory storage device 204 may be, for example, a memory storage device based on a variety of wireless communication technology, such as a near field communication (NFC) memory storage device, a wireless fidelity (WiFi) memory storage device, a Bluetooth memory storage device, or a low power Bluetooth memory storage device (e.g., iBeacon), etc. Furthermore, through the system bus 110, the motherboard 20 can also be coupled to various I/O devices, such as a global positioning system (GPS) module 205, a network interface card 206, a wireless transmission device 207, a keyboard 208, a monitor 209, a speaker 210, a mouse 211, etc. For example, in an exemplary embodiment, the motherboard 20 accesses the wireless memory storage device 204 through the wireless transmission device 207.

Figure 3:
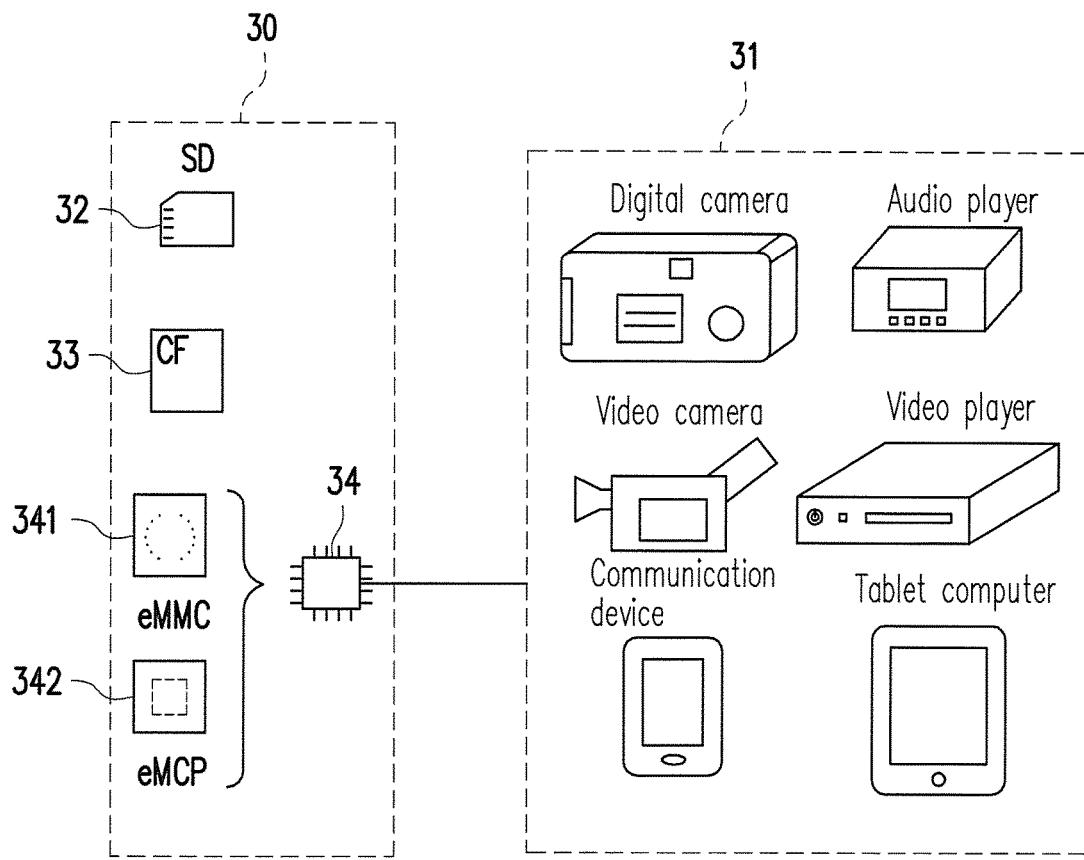
FIG. 3 is a schematic diagram illustrating a host system and a memory storage device according to another exemplary embodiment of the invention.

In an exemplary embodiment, the host system is any system that substantively coordinates with the memory storage device to store data. Although in the above exemplary embodiment, the host system is described as a computer system, FIG. 3 is a schematic diagram illustrating a host system and a memory storage device according to another exemplary embodiment of the invention. Referring to FIG. 3, in another exemplary embodiment, the host system 31 can also be a system, such as a digital camera, a video camera, a communication device, an audio player, a video player, or a tablet computer, etc. The memory storage device 30 can be a variety of non-volatile memory storage device, such as an SD card 32, a CF card 33, or an embedded storage device 34, etc. used by the same. The embedded storage device 34 includes various types of embedded storage device directly coupling a memory module onto a board of the host system, such as an embedded multi-media card (eMMC) 341 and/or an embedded multi-chip package (eMCP) 342, etc.

Figure 4:
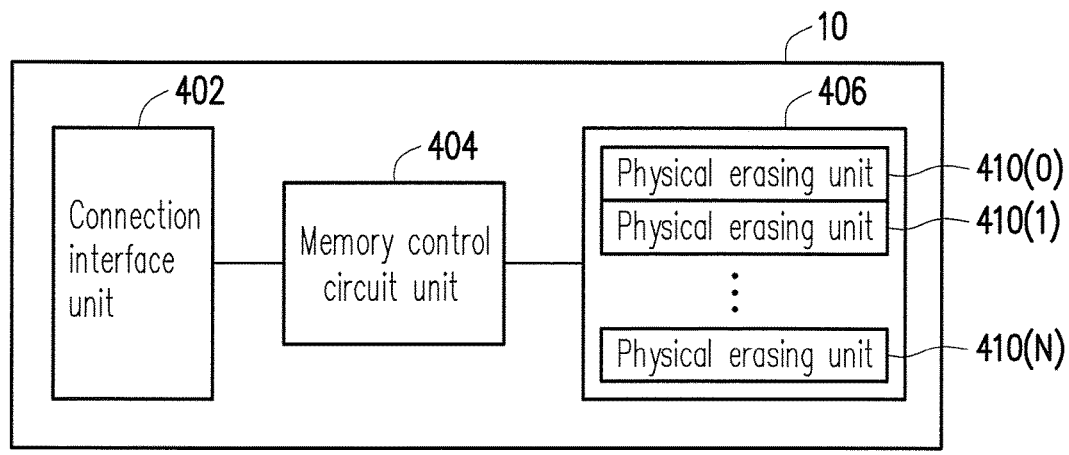
FIG. 4 is a schematic block diagram illustrating a memory storage device according to an exemplary embodiment of the invention.

FIG. 4 is a simple block diagram illustrating a memory storage device according to an exemplary embodiment of the invention.

Referring to FIG. 4, the memory storage device 10 includes a connection interface unit 402, a memory control circuit unit 404, and a rewritable non-volatile memory module 406.

In the exemplary embodiment, the connection interface unit 402 is compatible with the Serial Advanced Technology Attachment (SATA) standard. However, it should be understood that the invention is not limited thereto, and the connection interface unit 402 can also comply with the parallel advanced technology attachment (PATA) standard, the Institute of Electrical and Electronic Engineers (IEEE) 1394 standard, the peripheral component interconnect express (PCI Express) standard, the universal serial bus (USB) standard, the secure digital (SD) interface standard, the ultra high speed-I (UHS-I) interface standard, the ultra high speed-II (UHS-II) interface standard, the memory stick (MS) interface standard, the multi-chip package interface standard, the multi-media card (MMC) interface standard, the embedded multimedia card (eMMC) interface standard, the universal flash storage (UFS) interface standard, the embedded multi-chip package (eMCP) interface standard, the compact flash (CF) interface standard, the integrated device electronics (IDE) standard, or other suitable standards. The connection interface unit 402 and the memory control circuit unit 404 can be packaged into one chip, or the connection interface unit 402 can be arranged outside a chip including the memory control circuit unit 404.

The memory control circuit unit 404 is configured to execute a plurality of logic gates or control commands implemented in a manner of hardware or filmware and perform operations such as writing, reading and erasing data on the rewritable non-volatile memory module 406 according to commands of the host system 11.

The rewritable non-volatile memory module 406 is coupled to the memory control circuit unit 404 and is configured to store data written by the host system 11. The rewritable non-volatile memory module 406 has physical erasing units 410(0) to 410(N). For example, the physical erasing units 410(0) to 410(N) can belong to the same memory die or belong to different memory dies. Each physical erasing unit has a plurality of physical programming units, respectively, wherein the physical programming units belonging to the same physical erasing unit can be independently written and simultaneously erased. However, it should be understood that the invention is not limited thereto. Each physical erasing unit can be formed by 64 physical programming units, 256 physical programming units, or any other number of physical programming units.

More specifically, the physical erasing unit is the smallest unit for erasing. That is, each physical erasing unit contains the least number of memory cells that are erased together. The physical programming unit is the smallest unit for programming. That is, the physical programming unit is the smallest unit for writing data. Each physical programming unit usually includes a data bit area and a redundant bit area. The data bit area includes a plurality of physical access addresses configured to store user data, and the redundant bit area is configured to store system data (e.g., control information and error correcting codes). In the exemplary embodiment, each data bit area of the physical programming unit contains 8 physical access addresses, and the size of each physical access address is 512 bytes. However, in other exemplary embodiments, more or less number of the physical access addresses can also be contained in the data bit area, and the size and the amount of the physical access addresses are not limited in the invention. For example, in an exemplary embodiment, the physical erasing units are physical blocks, and the physical programming units are physical pages or physical sectors, but the invention is not limited thereto.

In the exemplary embodiment, the rewritable non-volatile memory module 406 is a multi-level cell (MLC) NAND flash memory module (i.e., a flash memory module capable of storing 2 data bits in one memory cell). However, the invention is not limited thereto, and the rewritable non-volatile memory module 406 can also be a single-level cell (SLC) NAND flash memory module (i.e., a flash memory module capable of storing 1 data bit in one memory cell), a trinary-level cell (TLC) NAND flash memory module (i.e., a flash memory module capable of storing 3 data bits in one memory cell), other flash memory modules, or other memory modules having the same characteristics.

Figure 5:
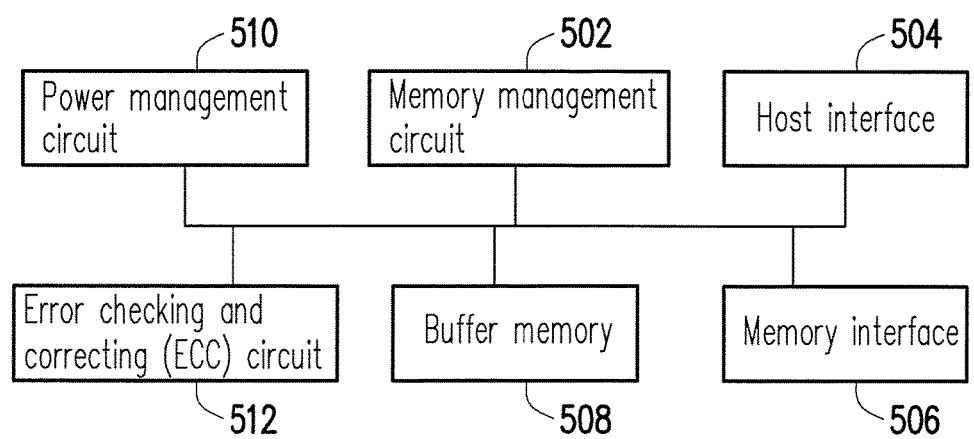
FIG. 5 is a simple block diagram illustrating a memory control circuit unit according to an exemplary embodiment.

FIG. 5 is a simple block diagram illustrating a memory control circuit unit according to an exemplary embodiment.

Referring to FIG. 5, the memory control circuit unit 404 includes a memory management circuit 502, a host interface 504, and a memory interface 506.

The memory management circuit 502 is configured to control the overall operation of the memory control circuit unit 404. More specifically, the memory management circuit 502 has a plurality of control commands. When the memory storage device 10 is in operation, the control commands are executed to perform operations such as writing, reading and erasing data.

In the exemplary embodiment, the control commands of the memory management circuit 502 are implemented in a manner of firmware. For example, the memory management circuit 502 has a microprocessor unit (not illustrated) and a read-only memory (not illustrated), and these control commands are burnt into the read-only memory. When the memory storage device 10 is in operation, the control commands are executed by the microprocessor unit to perform operations such as writing, reading and erasing data.

In another exemplary embodiment of the invention, the control commands of the memory management circuit 502 can also be stored in a specific area of the rewritable non-volatile memory module 406 (e.g., a system area in a memory module exclusively used for storing system data) in form of programming codes. Furthermore, the memory management circuit 502 has a microprocessor unit (not shown), a read-only memory (not illustrated), and a random access memory (not illustrated). In particular, the read-only memory has boot codes, and when the memory control circuit unit 404 is enabled, the microprocessor unit first executes the boot codes to load the control commands stored in the rewritable non-volatile memory module 406 into the random access memory of the memory management circuit 502. The microprocessor unit then runs the control commands to perform operations such as writing, reading and erasing data.

The host interface 504 is coupled to the memory management circuit 502 and configured to couple to the connection interface unit 402, so as to receive and identify commands and data transmitted by the host system 11. In other words, the commands and data transmitted by the host system 11 are transmitted to the memory management circuit 502 through the host interface 504. In the exemplary embodiment, the host interface 504 complies with the eMMC standard. However, it should be understood that the invention is not limited thereto. The host interface 504 can also comply with the PATA standard, the IEEE 1394 standard, the PCI Express standard, the UFS standard, the UHS-I interface standard, the UHS-II interface standard, the SD standard, the MS standard, the SATA standard, the CF standard, the IDE standard, or other suitable data transmission standards.

The memory interface 506 is coupled to the memory management circuit 502 and configured to access the rewritable non-volatile memory module 406. In other words, data to be written into the rewritable non-volatile memory module 406 is converted by the memory interface 506 into a format acceptable to the rewritable non-volatile memory module 406.

In an exemplary embodiment, the memory control circuit unit 404 further includes a buffer memory 508, a power management circuit 510, and an error checking and correcting (ECC) circuit 512.

The buffer memory 508 is coupled to the memory management circuit 502 and configured to temporarily store data and commands received from the host system 11 or data received from the rewritable non-volatile memory module 406.

The power management circuit 510 is coupled to the memory management circuit 502 and configured to control the power supply of the memory storage device 10.

The ECC circuit 512 is coupled to the memory management circuit 502 and configured to execute an ECC procedure to ensure data accuracy. More specifically, when the memory management circuit 502 receives a write command from the host system 11, the ECC circuit 512 generates a corresponding ECC code for data corresponding to the write command, and the memory management circuit 502 writes the data corresponding to the write command and the corresponding ECC code into the rewritable non-volatile memory module 406. Thereafter, when reading the data from the rewritable non-volatile memory module 406, the memory management circuit 502 simultaneously reads the ECC code corresponding to the data, and the ECC circuit 512 executes the ECC procedure on the read data according to the ECC code.

Figure 6:
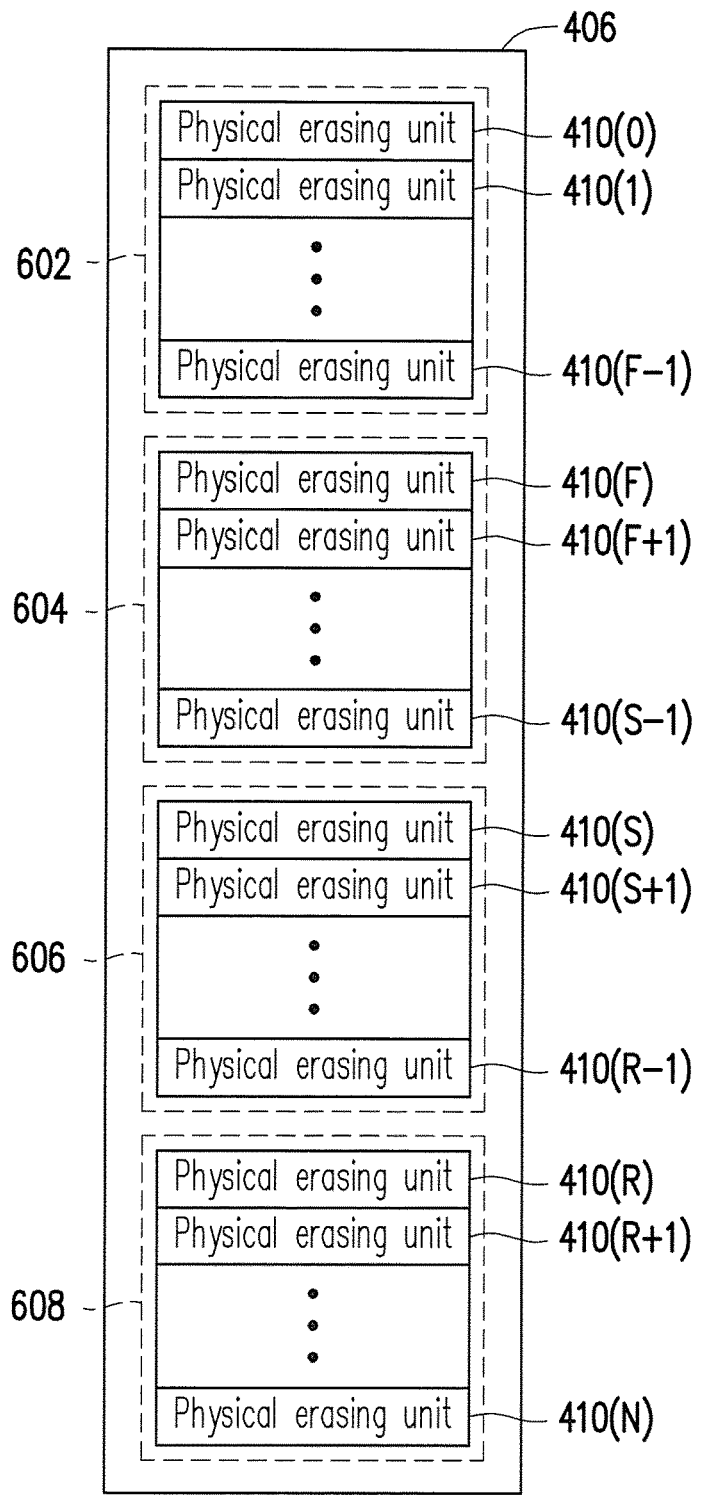
FIG. 6 is a schematic diagram illustrating managing a rewritable non-volatile memory module according to a first exemplary embodiment.

FIG. 6 is a schematic diagram illustrating managing a rewritable non-volatile memory module according to a first exemplary embodiment.

It should be understood that when describing operations of the rewritable non-volatile memory module 406 herein, the terms such as "select," "group," "divide," and "associate" are logical concepts. In other words, the actual positions of the physical erasing units of the rewritable non-volatile memory module are not changed, and the operations are logically performed on the physical erase units of the rewritable non-volatile memory module.

Referring to FIG. 6, the rewritable non-volatile memory module 406 has a plurality of physical erasing units 410(0) to 410(N). Each physical erasing unit has a plurality of physical programming units. In the exemplary embodiment, the physical programming unit is the smallest unit for programming. That is, the physical programming unit is the smallest unit for writing data. For example, the physical programming units are physical pages or physical sectors. If the physical programming units are physical pages, then each physical programming unit usually includes a data bit area and a redundant bit area. The data bit area contains a plurality of physical sectors configured to store user data, and the redundant bit area is configured to store system data (e.g., error correcting codes or other system data for management). In another aspect, the physical erasing unit is the smallest unit for erasing. That is, each physical erasing unit contains the least number of memory cells that are erased together. For example, the physical erasing units are physical blocks.

The memory control circuit unit 404 (or the memory management circuit 502) logically groups the physical erasing units 410(0) to 410(N) of the rewritable non-volatile memory module 406 into a data area 602, a spare area 604, a system area 606, and a replacement area 608.

The physical erasing units logically belonging to the data area 602 and the spare area 604 are configured to store data from the host system 11, and the physical erasing units in the data area 602 and the spare area 604 can be mapped to a plurality of logical units of the host system 11 (such as, the physical blocks of the data area 602 and the spare area 604 being mapped to logical blocks of the host system 11). More specifically, the physical erasing units of the data area 602 are regarded as physical erasing units already stored data, and the physical erasing units of the spare area 604 are configured to substitute the physical erasing units of the data area 602. In other words, it is assumed that the memory control circuit unit 404 (or the memory management circuit 502) receives the write command and the data to be written corresponding to the write command from the host system 11. The write command instructs to store the data to be written to at least one first logical unit. In response to the write command, the memory control circuit unit 404 (or the memory management circuit 502) stores the data to be written into at least one first physical erasing unit, mapping to the at least one first logical unit, of the rewritable non-volatile memory module 406. Alternatively, if the data area 602 does not have any physical erasing unit mapping to the at least one first logical unit, the memory control circuit unit 404 (or the memory management circuit 502) may select at least one physical erasing unit from the spare area 604 as the at least one first physical erasing unit, and then write data into the selected at least one physical erasing unit to substitute the physical erasing unit of the data area 602.

The physical erasing units logically belonging to the system area 606 are configured to record system data related to the rewritable non-volatile memory module 406. For example, the system data include the manufacturer and model of the rewritable non-volatile memory module 406, the memory die index of the rewritable non-volatile memory module 406, the number of the physical erasing units, the number of the physical programming units in each physical erasing unit, etc.

The physical erasing units logically belonging to the replacement area 608 are used in a defective physical erasing unit replacement procedure to replace damaged physical erasing units. More specifically, if there are still normal physical erasing units in the replacement area 608, and a physical erasing unit in the data area 502 is damaged, the memory control circuit unit 404 (or the memory management circuit 502) may select a normal physical erasing unit from the replacement area 508 to replace the damaged physical erasing unit.

In particular, the numbers of the physical erasing units of the data area 602, the spare area 604, the system area 606, and the replacement area 608 vary according to different memory specifications. Additionally, it should be understood that during the operation of the memory storage device 10, the grouping relations of the physical erasing units being associating with (or being grouping to) the data area 602, the spare area 604, the system area 606, and the replacement area 608 would be dynamically changed. For example, when a physical erasing unit in the spare area 604 is damaged and replaced by a physical erasing unit of the replacement area 608, the physical erasing unit originally of the replacement area 608 is associated with the spare area 604. Alternatively, after selecting a physical erasing unit from the spare area 604 to store written data, the memory control circuit unit 404 (or the memory management circuit 502) associates the physical erasing unit with the data area 602, and maps the logical unit corresponding to the written data to the physical erasing unit.

Figure 7:
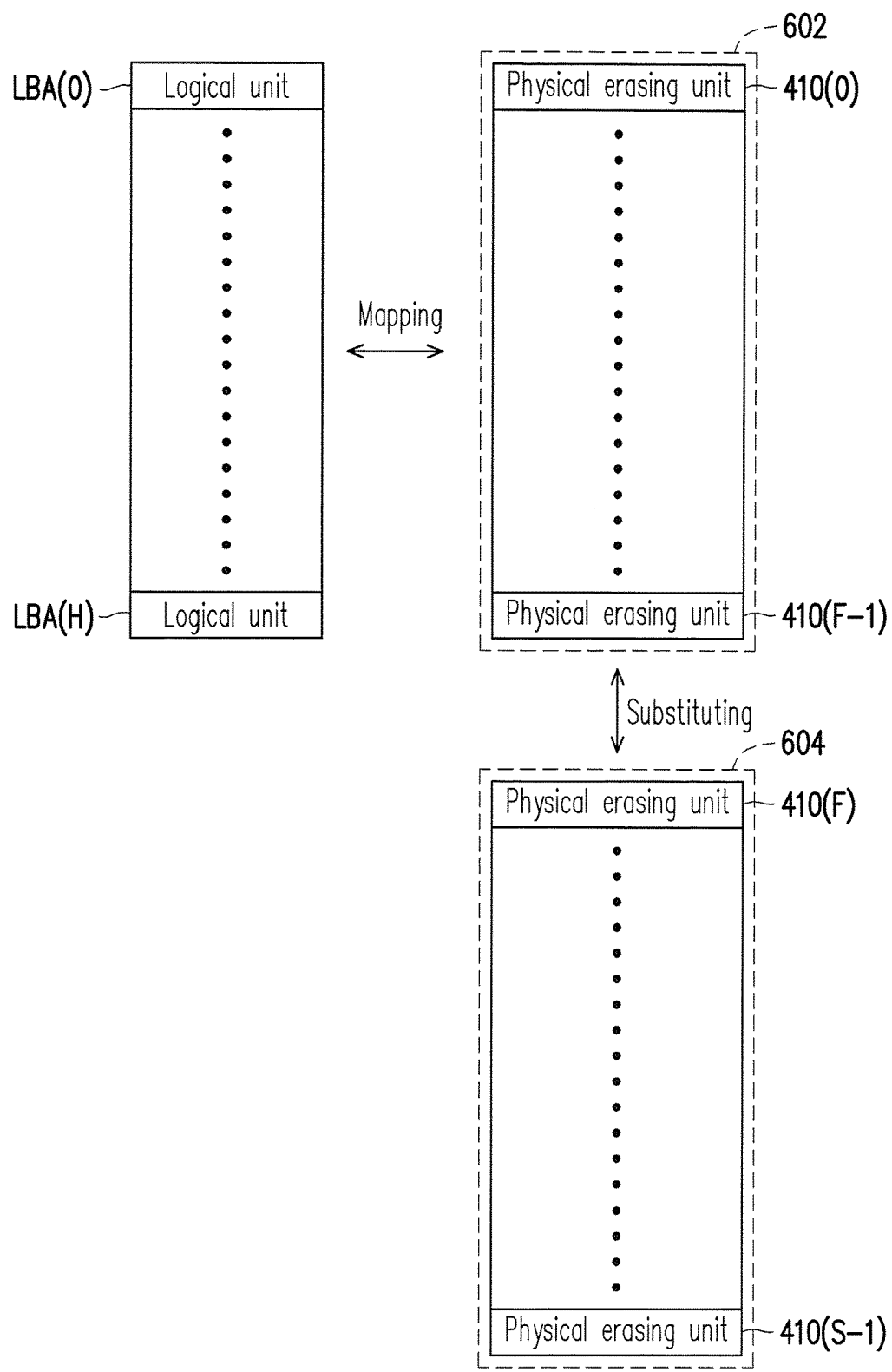
FIG. 7 is a schematic diagram illustrating managing the rewritable non-volatile memory module according to the first exemplary embodiment.

FIG. 7 is a schematic diagram illustrating managing the rewritable non-volatile memory module according to the first exemplary embodiment. FIGS. 6 and 7 are referred together below to describe the management structure of the rewritable non-volatile memory module.

Referring to FIG. 7, it is assumed that the memory control circuit unit 404 (or the memory management circuit 502) has logical units LBA(0) to LBA(H) to be mapped to the physical erasing units 410(0) to 410(F−1) of the data area 602, and the host system 11 accesses data in the data area 602 through the logical units LBA(0) to LBA(H). Herein, each of the logical units LBA(0) to LBA(H) can be formed by one or a plurality of logical addresses. For example, the logical units are logical blocks, logical pages, or logical sectors. One logical unit may be mapped to one or more physical units, wherein the physical units are one or more physical addresses, one or more physical sectors, one or more physical programming units, or one or more physical erasing units.

In the exemplary embodiment, the memory control circuit unit 404 (or the memory management circuit 502) may establish a logical-to-physical address mapping table and a physical-to-logical address mapping table to record the mapping relation between the logical units (such as, the logical blocks, the logical pages, or the logical sectors) and the physical units (such as, the physical erasing units, the physical programming units, the physical sectors). In other words, the memory control circuit unit 404 (or the memory management circuit 502) can search and find a physical unit mapped to a logical unit through the logical-to-physical address mapping table, and the memory control circuit unit 404 (or the memory management circuit 502) can search and find a logical unit mapped to a physical unit through the physical-to-logical address mapping table. When the memory control circuit unit 404 (or the memory management circuit 502) intends to update the mapping of a particular logical unit, the logical-to-physical address mapping table corresponding to the logical unit would be loaded to the buffer memory to be updated. Similarly, the memory control circuit unit 404 may also correspondingly update the physical-to-logical address mapping table.

For example, it is assumed that the memory control circuit unit 404 (or the memory management circuit 502) has logical units LBA(0) to LBA(H) to be mapped to the physical erasing units 410(0) to 410(F−1) of the data area 602, and has data to be written into the logical unit LBA(0). If the logical unit LBA(0) is not yet mapped to any physical erasing unit, the memory control circuit unit 404 (or the memory management circuit 502) may select a physical erasing unit (such as, a physical erasing unit 410(F)) from the spare area 604 to store the data. In addition, after writing the data into the physical erasing unit 410(F), the memory control circuit unit 404 (or the memory management circuit 502) associates the physical erasing unit 410(F) with the data area 602, maps the logical unit LBA(0) to the physical erasing unit 410(F), and records the logical address of the logical unit LBA(0) and the physical address of the logical unit LBA(0) mapped to the logical unit LBA(0), so as to update the logical-to-physical address mapping table and the physical-to-logical address mapping table.

FIG. 8 is a schematic diagram illustrating a logical-to-physical address mapping table and a physical-to-logical address mapping table according to an exemplary embodiment of the invention.

Referring to FIG. 8, in the exemplary embodiment, it is assumed that logical units are, for example, logical pages, and the memory control circuit unit 404 (or the memory management circuit 502) has a plurality of physical programming units to be mapped to the logical units (logical pages) of the host system. For the convenience of illustration, it is simply assumed herein that the logical-to-physical address mapping table 820 and the physical-to-logical address mapping table 830 record the mapping relation between 8 logical units and 8 physical programming units.

For example, it is assumed that logical addresses of the 8 logical units "A" to "H" are logical addresses 801(0) to 801(7) respectively, and physical addresses of the 8 physical programming units "a" to "h" are physical addresses 901(0) to 901(7) respectively. The logical-to-physical address mapping table 820 records the logical addresses 801(0) to 801(7) of the 8 logical units "A" to "H" and the physical addresses 901(0) to 901(7) of the 8 physical programming units "a" to "h" respectively mapped to the 8 logical units "A" to "H". In simple words, it can also be said that the logical addresses 801(0) to 801(7) are mapping to the physical addresses 901(0) to 901(7). For example, through the logical address 801(0), the physical address 901(7) would be searched and found, and it is known that the physical programming unit mapped to the logical unit "A" corresponding to the logical address 801(0) is the physical programming unit "h" corresponding to the physical address 901(7). In a similar manner, according to the logical-to-physical address mapping table 820, it is known that the logical address 801(1) is mapping to the physical address 901(3); the logical address 801(2) is mapping to the physical address 901(4); the logical address 801(3) is mapping to the physical address 901(5); the logical address 801(4) is mapping to the physical address 901(2); the logical address 801(5) is mapping to the physical address 901(1); the logical address 801(6) is mapping to the physical address 901(6); the logical address 801(7) is mapping to the physical address 901(0). In other words, according to the logical-to-physical address mapping table 820, it is known that the logical unit "A" is mapping to the physical programming unit "h"; the logical unit "B" is mapping to the physical programming unit "d"; the logical unit "C" is mapping to the physical programming unit "e"; the logical unit "D" is mapping to the physical programming unit "f"; the logical unit "E" is mapping to the physical programming unit "c"; the logical unit "F" is mapping to the physical programming unit "b"; the logical unit "G" is mapping to the physical programming unit "g"; the logical unit "H" is mapping to the physical programming unit "a".

In contrast, the physical-to-logical address mapping table 830 records the physical addresses 901(0) to 901(7) of the 8 physical programming units "a" to "h" and the logical addresses 801(0) to 801(7) of the 8 logical units "A" to "H" respectively mapped to the 8 physical programming units "a" to "h".

For example, according to the physical-to-logical address mapping table 830, it is known that the physical address 901(0) is mapping to the logical address 801(7); the physical address 901(1) is mapping to the logical address 801(5); the physical address 901(2) is mapping to the logical address 801(4); the physical address 901(3) is mapping to the logical address 801(1); the physical address 901(4) is mapping to the logical address 801(2); the physical address 901(5) is mapping to the logical address 801(3); the physical address 901(6) is mapping to the logical address 801(6); the physical address 901(7) is mapping to the logical address 801(0). In other words, according to the physical-to-logical address mapping table 830, it is known that the physical programming unit "a" is mapping to the logical unit "H"; the physical programming unit "b" is mapping to the logical unit "F"; the physical programming unit "c" is mapped to the logical unit "E"; the physical programming unit "d" is mapping to the logical unit "B"; the physical programming unit "e" is mapping to the logical unit "C"; the physical programming unit "f" is mapping to the logical unit "D"; the physical programming unit "g" is mapping to the logical unit "G"; the physical programming unit "h" is mapping to the logical unit "A".

Note that the number of elements in the logical-to-physical address mapping table and the physical-to-logical address mapping table above are exemplary and should not be construed as a limitation to the invention. A manufactory may use other number and form of logical addresses and physical addresses to design the logical-to-physical address mapping table and the physical-to-logical address mapping table.

In the exemplary embodiment, when the memory control circuit unit 404 (or the memory management circuit 502) intends to write data into a physical erasing unit, the memory control circuit unit 404 (or the memory management circuit 502) determines whether the physical erasing unit is already or about to be fully written. If the physical erasing unit is already or about to be fully written, the memory control circuit unit 404 (or the memory management circuit 502) selects another physical erasing unit from the spare area 604 as the currently used physical erasing unit, so as to continue to write data to the (selected) currently used physical erasing unit. Furthermore, the memory control circuit unit 404 (or the memory management circuit 502) performs a data merging procedure or a garbage collection procedure to one or more physical erasing units storing valid data in the data area 602, so as to release one or more physical erasing units and associate the same with the spare area 604. For example, the memory control circuit unit 404 (or the memory management circuit 502) may write data belong to a logical unit into a physical erasing unit selected from the spare area 604 and labels a portion of data of a physical erasing unit originally mapped to the logical unit in the data area 602 as invalid. Then, the memory control circuit unit 404 (or the memory management circuit 502) copies the remaining valid data in the physical erasing unit, originally mapped to the logical unit, to the physical erasing unit selected from the spare area 604 and associates the one physical erasing unit originally mapped to the logical unit with the spare area 604. Thus, the data merging procedure is completed once. In the garbage collection procedure, valid data stored in one or more physical programming units in the data area 602 is copied to one or more physical erasing units selected from the spare area 604, and a physical erasing unit having all copied valid data stored therein is associated with the spare data 604. The physical erasing unit about to be associated with the spare data 604 may be associated with the spare area 604 after being erased, or be erased after being associated with the spare area 604. The time point of the erasing is not limited herein.

Generally, a method of recording valid data and invalid data is related to a garbage collection operation. According to a memory management method provided in the exemplary embodiment, logical addresses and physical addresses storing invalid data are truly updated according to an adjust command (recording information regarding to the logical addresses and physical addresses storing invalid data) by consuming only a short period of time. Thus, the garbage collection operation may be performed based on the updated/recorded information regarding to the logical addresses and physical addresses storing invalid data, so as to enhance efficiency of garbage collection. In the exemplary embodiment, the adjust command is configured to indicate that data stored in at least one logical unit among the logical units is invalid, and the adjust command can be a trim command, a delete command . . . or other commands. For the convenience of illustration, descriptions below are provided using a trim command as the adjust command.

Figure 11:
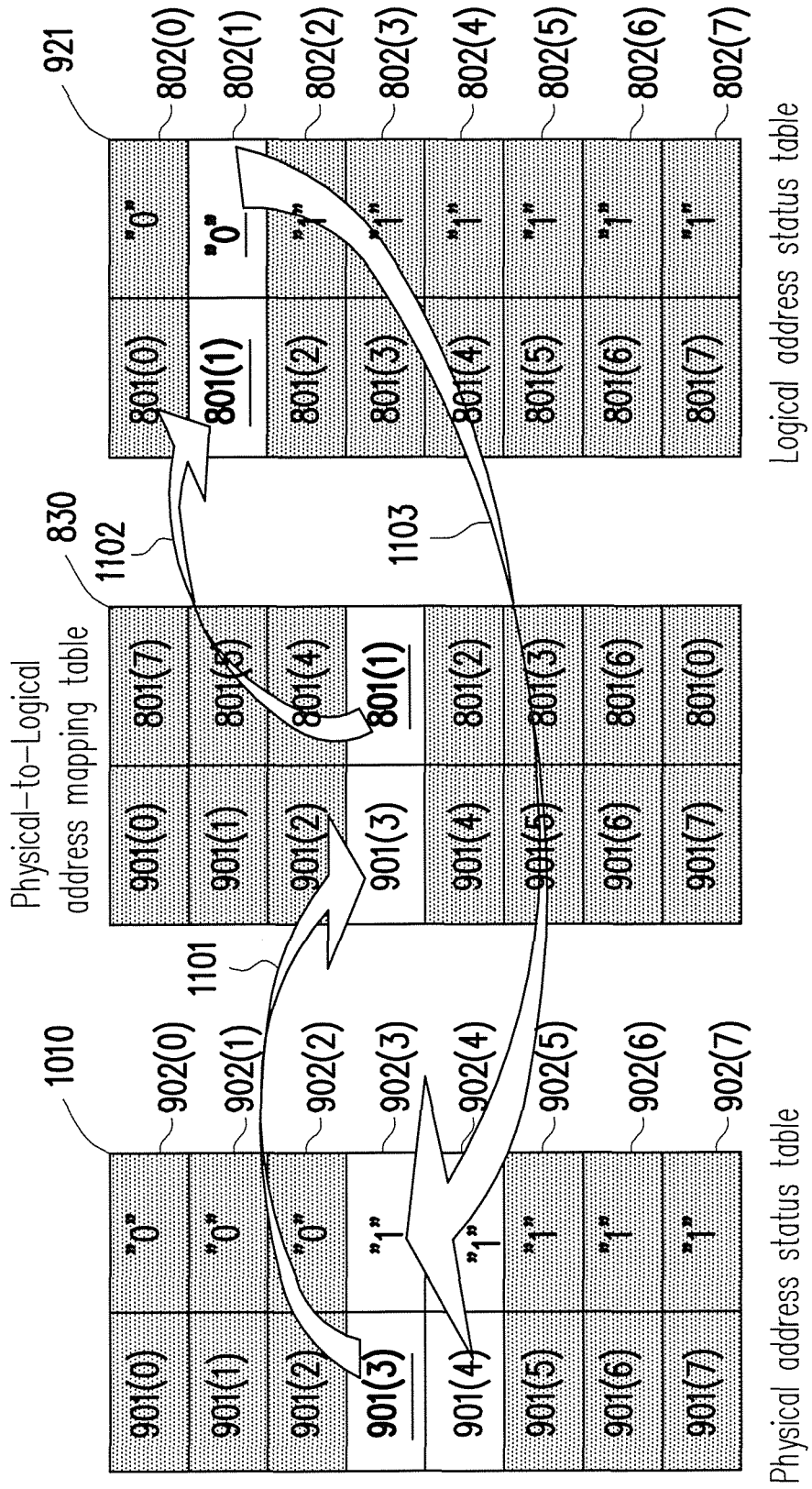
FIG. 11 is a schematic diagram illustrating an updated physical address status table according to an exemplary embodiment of the invention.

More specifically, in the exemplary embodiment, the memory control circuit unit 404 (or the memory management circuit 502) uses a logical address status table to reflect (record) a data status (such as, valid status or invalid status) of data stored in a plurality of logical units of the host system, such that whether the data stored in the plurality of logical units of the host system is valid is determined by searching and finding the logical address status table thereafter. Similarly, the memory control circuit unit 404 (or the memory management circuit 502) uses a physical address status table to reflect (record) a data status (such as, valid status or invalid status) of data stored in a plurality of physical units of the memory storage device 10, such that whether the data stored in the plurality of physical units of the memory storage device 10 is valid is determined by searching and finding the physical address status table thereafter. In other words, after the memory control circuit unit 404 (or the memory management circuit 502) receives the adjust command, the memory control circuit unit 404 (or the memory management circuit 502) correspondingly updates the logical address status table and the physical address status table according to the logical address of invalid data indicated by the adjust command. Thus, the memory control circuit unit 404 (or the memory management circuit 502) uses the data status of data stored in the logical addresses or the physical addresses as reflected by the logical address status table and the physical address status table to perform further management (such as, the garbage collection operation). FIGS. 9, 10 and 11 are referred together below to describe in detail the memory management method provided in the invention, which is capable of effectively processing the received adjust command.

FIG. 9 is a schematic diagram illustrating updating a logical address status table according to an adjust command according to an exemplary embodiment of the invention.

Referring to FIG. 9, for example, it is assumed that the logical address status table 920 records the logical addresses 801(0) to 801(7) of the logical units "A" to "H" and the data statuses 802(0) to 802(7) of the data stored in the logical addresses 801(0) to 801(7) respectively. The data status includes a first state (such as, a first state marked as "1") or a second state (such as, a second state marked as "0"). In the embodiment, the first state is configured to indicate that the data stored in the logical addresses is valid, and the second state is configured to indicate that the data stored in the logical addresses is invalid, but the invention is not limited thereto. For example, in another embodiment, the first state is configured to indicate that the data stored in the logical addresses is invalid, and the second state is configured to indicate that the data stored in the logical addresses is valid. Furthermore, a manufactory may also use other suitable manners to indicate the first state and the second state. For example, the first state can be marked as "1" or "00", and the second state can be marked as "0" or "11".

It can be seen from FIG. 9 that all the data stored in the logical addresses 801(0) to 801(7) is in the first state (such as, "1"). In other words, all the data stored in the logical addresses 801(0) to 801(7) is valid. It is assumed that the memory control circuit unit 404 (or the memory management circuit 502) receives an adjust command 910 from the host system 11, wherein the adjust command 910 indicates that the data stored in the logical units 801(0) and 801(1) has become invalid (such as, the data status of the data would be the second state). Next, the memory control circuit unit 404 (or the memory management circuit 502) may update the logical address status table 920 according to the adjust command 910. More specifically, according to the adjust command, the memory control circuit unit 404 (or the memory management circuit 502) adjusts the data statuses 802(0) and 802(1) corresponding to the logical addresses 801(0) and 801(1) from "1" to "0", so as to update the logical address status table 920 into an updated logical address status table 921.

Note that the number of elements in the adjust command and the logical address status table above are exemplary and should not be construed as a limitation to the invention. A manufactory may use other numbers of logical addresses and number and form of data status to design the adjust command or the logical address status table.

FIG. 10 is a schematic diagram illustrating a physical address status table according to an exemplary embodiment of the invention.

Referring to FIG. 10, in the exemplary embodiment, as mentioned above, the memory control circuit unit 404 (or the memory management circuit 502) establishes at least one physical address status table to record a data status of data stored in a plurality of physical units, thereby to determine whether the data stored in the physical units is valid. More specifically, the memory control circuit unit 404 (or the memory management circuit 502) may assign at least one physical unit (also called a super block) having at least one physical programming unit storing valid data into a data link. The physical unit is, for example, a physical erasing unit or a physical block. In the exemplary embodiment, the physical unit has 1 physical erasing unit. However, in other embodiments, the physical unit can also have other numbers of physical erasing units. The data link has one physical address status table. The physical address status table records a physical address of each of the plurality of physical programming units of the at least one physical unit and the data status of the data stored in each of the plurality of physical programming units of the at least one physical unit. In other words, in the exemplary embodiment, the physical address status table reflects the physical addresses and the corresponding data status of the plurality of physical programming units in the corresponding data link. Note that in another embodiment, the memory control circuit unit 404 (or the memory management circuit 502) assigns the physical programming units mapped to the logical units into a plurality of data links, wherein each of the data links may be disposed with one physical address status table. For the convenience of illustration, in the following embodiments, a physical address status table corresponding to a data link having a physical unit, physical programming units of the physical unit corresponding to the data link, and logical units "A" to "H" mapped to the data link are provided as an example, wherein the physical unit has 8 physical programming units "a" to "h".

For example, similar to the logical address status table in FIG. 9, it is assumed that the memory control circuit unit 404 (or the memory management circuit 502) has established a physical address status table 1010, wherein the physical address status table records the physical addresses 901(0) to 901(7) corresponding to the physical programming units "a" to "h" and the data statuses 902(0) to 902(7) of data stored in the physical addresses 901(0) to 901(7). According to the manner of determining the data status in the example of FIG. 9, it is known that the data stored in the logical units "A" to "C" in FIG. 10 are invalid (e.g., marked as "0"), and the data stored in the logical units "D" to "H" are valid (e.g., marked as "1"). Note that the number of elements in the physical address status table above is exemplary and should not be construed as a limitation to the invention. A manufactory may use other numbers of physical addresses and number and form of data status to design the physical address status table.

In the exemplary embodiment, after receiving the adjust command, the memory control circuit unit 404 (or the memory management circuit 502) may first update the logical address status table. In other words, in response to the received adjust command, the memory control circuit unit 404 (or the memory management circuit 502) may update the logical address status table, but not update the physical address status table. In addition, after the logical address status table is updated, the memory control circuit unit 404 (or the memory management circuit 502) would respond to the host system that the processing of the received adjust command received is completed.

It is should be mentioned that a plurality of logical addresses indicated by the adjust command are generally continuous, and the physical addresses mapping to the logical addresses may not be continuous. Therefore, by only updating the logical address status table and not updating the physical address status table, the time for completely processing the adjust command can be effectively saved.

However, in the exemplary embodiment, the memory control circuit unit 404 (or the memory management circuit 502) may update the physical address status table at a predetermined time point. More specifically, the memory control circuit unit 404 (or the memory management circuit 502) may determine whether the host system 11 meets a predetermined condition to accordingly determine whether to update the physical address status table. For example, if the host system 11 is idle (for example, the host system is not performing writing and reading operations for more than a predetermined period of time), the memory control circuit unit 404 (or the memory management circuit 502) determines that the predetermined condition is met. As another example, if the memory control circuit unit 404 (or the memory management circuit 502) determines that the garbage collection operation should be performed to the memory storage device now, the predetermined condition is determined to be met. As another example, if the memory control circuit unit 404 (or the memory management circuit 502) has resources for performing an operation of updating the physical address status table (e.g., when performing continuous reading operations, or performing a power-off operation), the predetermined condition is determined to be met.

If the predetermined condition is determined to be met, the memory control circuit unit 404 (or the memory management circuit 502) updates the physical address status table 1010 according to the updated logical address status table 921 and the physical address status table 1010. More specifically, if the predetermined condition is met, the memory control circuit unit 404 (or the memory management circuit 502) updates the physical address status table according to a comparison result of the logical address status table and the physical address status table. More specifically, if the predetermined condition is met, the memory control circuit unit 404 (or the memory management circuit 502) selects at least one physical address from the physical address status table and, according to the selected physical address and the logical address status table, compares the data status of the logical address corresponding to the selected physical address and the data status of the selected physical address.

In the exemplary embodiment, the memory control circuit unit 404 (or the memory management circuit 502) may sequentially check the at least one physical unit of the data link in a predetermined order through the physical address status table. The memory control circuit unit 404 (or the memory management circuit 502) may thereby select the physical address for performing the comparison.

More specifically, the memory control circuit unit 404 (or the memory management circuit 502) may sequentially check a plurality of physical addresses and the corresponding plurality of data statuses recorded by the physical address status table 1010 in the predetermined order, so as to identify the plurality of physical addresses having the first state as the data status in the physical address status table 1010. The predetermined order is, for example, in an order from the foremost physical address to the rearmost physical address, from the rearmost physical address to the foremost physical address, or from the earliest time to the latest time according to the time of the physical address and the data status recorded by the physical address status table.

For example, if the predetermined condition is determined to be met, the memory control circuit unit 404 (or the memory management circuit 502) accordingly selects a physical address (hereafter also refers to as a first physical address) having the first state (e.g., "1") as the data status in the plurality of physical addresses 901(0) to 901(7) recorded by the physical address status table 1010. For the convenience of illustration, the number of the selected first physical address is herein set as one, but the invention is not limited thereto, and a manufactory may set suitable numbers to select the first physical address at will. For example, the memory control circuit unit 404 (or the memory management circuit 502) selects the physical address 901(3) having the first state as the data status as the first physical address.

In the exemplary embodiments, it is herein assumed that the predetermined order is in an order according to the time of the physical address and the data status recorded by the physical address status table, from the earliest time to the latest time. During the operation of the memory control circuit unit 404 (or the memory management circuit 502) sequentially checking the plurality of physical addresses and the corresponding plurality of data statuses recorded by the physical address status table 1010 in the predetermined order, the memory control circuit unit 404 (or the memory management circuit 502) may select the first physical address (intended for checking) according to an order of chronological precedence of recording the physical address and the corresponding data status. More specifically, it is assumed that the physical addresses 901(0) to 901(7) recorded by the physical address status table 1010 are recorded downward beginning from the first entry of the physical address status table according to the chronological precedence of recording. In other words, in the physical address status table 1010, the physical address 901(0) and the corresponding data status 902(0) are the earliest entry recorded in the physical address status table 1010, and the physical address 901(7) and the corresponding data status 902(7) are the latest entry recorded in the physical address status table 1010. Accordingly, the memory control circuit unit 404 (or the memory management circuit 502) sequentially determines whether the data statuses corresponding to the physical addresses 901(0) to 901(7) are the first state from top to bottom according to the positions of the physical 901(0) to 901(7) and the corresponding data statuses. For example, the memory control circuit unit 404 (or the memory management circuit 502) begins determination from the physical address 901(0) and the data status 902(0), and then the first physical address having the first state as the data status found by the memory control circuit unit 404 (or the memory management circuit 502) would be the physical address 901(3). Next, the memory control circuit unit 404 (or the memory management circuit 502) selects the physical address 901(3) as the first physical address to compare the data status of the first logical address mapping to the first physical address and the data status of the first physical address according to the logical address status table, so as to perform following updating operation to the physical address status table 1010. Note that after completing the processing of the updating operation of the physical address status table 1010 of selecting the physical address 901(3) as the first physical address, the memory control circuit unit 404 (or the memory management circuit 502) may continuously determine the data status 902(4) corresponding to the physical address 901(4) according to the determination order mentioned above. In a similar manner, the memory control circuit unit 404 (or the memory management circuit 502) determines the data statuses 902(0) to 902(7) of all of the physical addresses 901(0) to 901(7) in the physical address status table 1010, so as to complete the updating operation to the physical address status table 1010.

It is worth noting that the invention is not limited to the above manner of selecting the first physical address. For example, in another embodiment, the memory control circuit unit 404 (or the memory management circuit 502) records the physical addresses 901(0) to 901(7) and the corresponding data statuses 902(0) to 902(7) in the physical address status table 1020, and the memory control circuit unit 404 (or the memory management circuit 502) also records the time of recording the physical addresses 901(0) to 901(7) and the corresponding data statuses 902(0) to 902(7) in time stamps 1001(0) to 1001(7). Thus, the memory control circuit unit 404 (or the memory management circuit 502) may sequentially determine the data statuses of the physical addresses by determining the chronological precedence of recording with the time stamps 1001(0) to 1001(7). For example, the time stamps 1001(0) to 1001(7) corresponding to the physical addresses 901(0) to 901(7) and the corresponding data statuses 902(0) to 902(7) are "1", "2", "3", "4", "5", "6", "7" and "8" respectively, wherein the smaller the number indicates the earlier time of recording. In other words, the memory control circuit unit 404 (or the memory management circuit 502) may determine whether the data status is the first state from the physical address 901(0) to the physical address 901(7) according to the chronological precedence of recorded time. For example, the memory control circuit unit 404 (or the memory management circuit 502) would first determine the data status 1001(0) of the physical address 901(0), and lastly determine the data status 1001(7) of the physical address 901(7). Thus, since the first physical address having the first state as the data status is the physical address 901(3), the memory control circuit unit 404 (or the memory management circuit 502) would select the physical address 901(3) as the first physical address.

In the exemplary embodiment, after selecting the first physical address, the memory control circuit unit 404 (or the memory management circuit 502) determine whether the data status corresponding to the first physical address in the physical address status table needs to be updated according to the physical-to-logical address mapping table, the logical address status table, and the first physical address.

More specifically, the memory control circuit unit 404 (or the memory management circuit 502) identifies a first logical address mapping to the first physical address according to the physical-to-logical address mapping table. Next, the memory control circuit unit 404 (or the memory management circuit 502) determines whether the data status corresponding to the first logical address is the second state according to the logical address status table and the first logical address. If the data status corresponding to the first logical address in the logical address status table is the second state (e.g., the data status corresponding to the first logical address in the logical address status table is different from the data status corresponding to the first physical address in the physical address status table), the memory control circuit unit 404 (or the memory management circuit 502) determines the data status corresponding to the first physical address in the physical address status table needs to be updated, and the memory control circuit unit 404 (or the memory management circuit 502) would adjust the data status corresponding to the first physical address in the physical address status table from the first state to the data status corresponding to the first logical address in the logical address status table (e.g., the second state).

FIG. 11 is a schematic diagram illustrating an updated physical address status table according to an exemplary embodiment of the invention.

For example, Referring to FIG. 11, it is assumed that the memory control circuit unit 404 (or the memory management circuit 502) has selected the first physical address 901(3) having the first state (e.g., "1") as the data status from the physical address status table 1010. According to the physical-to-logical address mapping table 830 and the first physical address 901(3), the memory control circuit unit 404 (or the memory management circuit 502) identifies the logical address 801(1) (also called the first logical address) mapping to the first physical address 901(3) (as shown as arrow 1101). Next, according to the logical address status table 921 and the first logical address 801(1), the memory control circuit unit 404 (or the memory management circuit 502) may determine whether the data status of the first logical address 801(1) in the logical address status table is the second state (e.g., "0") (as shown as arrow 1102). In this example, since the data status 802(1) of the logical address 801(1) is the second state (different from the first state of the data status of the first physical address), the memory control circuit unit 404 (or the memory management circuit 502) adjusts the data status 902(3) corresponding to the first physical address 901(3) in the physical address status table 1010 from the first state to the second state (as shown as arrow 1103). Thus, through the above process, the memory control circuit unit 404 (or the memory management circuit 502) completes the updating operation to the data status of the first physical address 901(3) selected from the physical address status table 1010.

As mentioned above, the memory control circuit unit 404 (or the memory management circuit 502) may continuously select other physical addresses (e.g., the physical addresses 901(4) to 901(7)) having the first state in the physical address status table to perform updating operations in a method similar to the above example and the detail would be omitted herein.

It is worth noting that according to the foregoing memory management method, the system idle time can be used for updating the physical address status table. Thus, when the memory control circuit unit 404 (or the memory management circuit 502) performs the garbage collection operation, the memory control circuit unit 404 (or the memory management circuit 502) directly identifies the physical address storing invalid data (such as, the physical address having the second state as the data status) through the physical address status table, without requiring other resources to determine the current address storing invalid data in the memory storage device, thereby enhancing efficiency of garbage collection.

Figure 12:
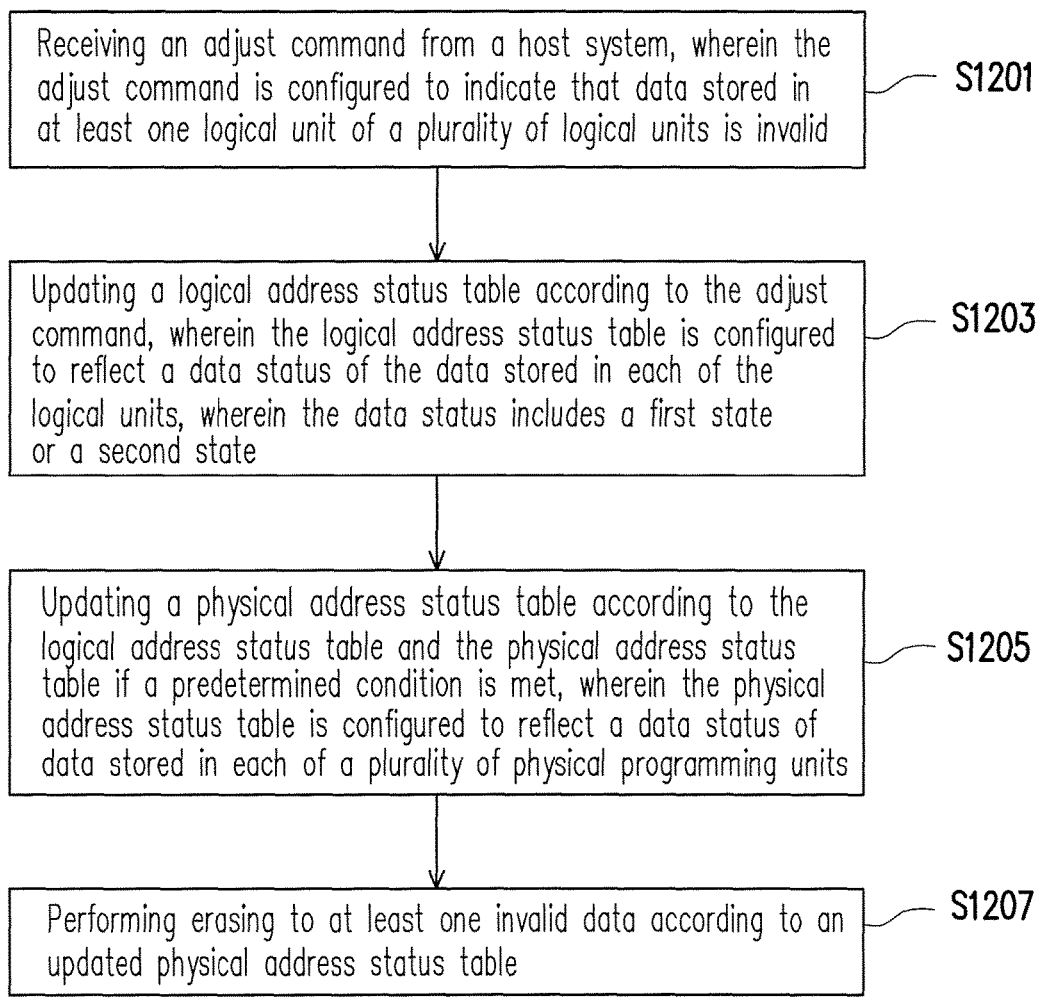
FIG. 12 is a flow diagram illustrating a memory management method according to an exemplary embodiment of the invention.

FIG. 12 is a flow diagram illustrating a memory management method according to an exemplary embodiment of the invention.

Referring to FIG. 12, in step S1201, the memory control circuit unit 404 (or the memory management circuit 502) receives an adjust command from a host system, wherein the adjust command is configured to indicate that data stored in at least one logical unit of a plurality of logical units is invalid. In step S1203, the memory control circuit unit 404 (or the memory management circuit 502) updates a logical address status table according to the adjust command, wherein the logical address status table is configured to reflect a data status of the data stored in each of the logical units, wherein the data status includes a first state or a second state. In step S1205, the memory control circuit unit 404 (or the memory management circuit 502) updates a physical address status table according to the logical address status table and the physical address status table if a predetermined condition is met, wherein the physical address status table is configured to reflect a data status of data stored in each of a plurality of physical programming units. In step S1207, the memory control circuit unit 404 (or the memory management circuit 502) performs erasing to at least one invalid data according to an updated physical address status table.

As mentioned above, according to the memory management method provided in the exemplary embodiment, the garbage collection operation is executed based on updated/recorded information regarding the logical address and the physical address storing invalid data, so as to enhance efficiency of garbage collection. More specifically, in the exemplary embodiment, the memory control circuit unit 404 (or the memory management circuit 502) truly updates the physical address status table according to the adjust command, wherein the data status recorded by the physical address status table after being updated (also called an updated physical address status table) truly (reliably) reflects that the data stored in the physical address in the updated physical address status table is valid or invalid. Thus, during the garbage collection operation, the memory control circuit unit 404 (or the memory management circuit 502) may collect at least one (part of or all) valid data according to the at least one physical address storing valid data as recorded in the updated physical address status table, so as to prevent meaningless collection (namely, the collected data is actually the invalid data). Furthermore, during the garbage collection operation, the memory control circuit unit 404 (or the memory management circuit 502) also identifies at least one other physical address storing invalid data as recorded in the updated physical address status table, so as to perform erasing to at least one (part of or all) invalid data, thereby releasing more physical storage space. As for the general methods of collection of valid data and erasing of invalid data during garbage collection operation, the general methods are familiar to persons skilled in the art and are not repeated herein.

In summary of the above, the memory management method, the memory control circuit unit and the memory storage device provided in the exemplary embodiments of the invention update the logical address status table according to the received adjust command, and update the physical address status table according to the updated logical address status table when the system is idle, so as to reduce time consumed for processing the adjust command, thereby enhancing work efficiency.

Although the present invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A memory management method for a rewritable non-volatile memory module, wherein the rewritable non-volatile memory module comprises a plurality of physical erasing units, wherein each of the plurality of physical erasing units has a plurality of physical programming units, wherein the plurality of physical programming units are mapping to a plurality of logical units, the memory management method comprising:
    receiving an adjust command from a host system, wherein the adjust command is configured to indicate that data stored in at least one logical unit among the plurality of logical units is invalid;
    updating a logical address status table according to the adjust command, wherein the logical address status table is configured to reflect a data status of the data stored in each of the plurality of logical units, wherein the data status comprises a first state or a second state;
    updating a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units, wherein the step of updating the physical address status table according to the comparison result of the logical address status table and the physical address status table if the predetermined condition is met comprises:
        selecting a first physical address having the first state as the data status from a plurality of physical addresses reflected by the physical address status table according to the physical address status table if the predetermined condition is met; and
        determining whether the data status corresponding to the first physical address in the physical address status table needs to be updated according to the first physical address; and
    performing erasing to at least one invalid data according to the updated physical address status table.

2. The memory management method according to claim 1, wherein the step of determining whether the data status corresponding to the first physical address in the physical address status table needs to be updated according to the first physical address comprises:
    determining whether the data status corresponding to the first physical address in the physical address status table needs to be updated according to a physical-to-logical address mapping table, the logical address status table, and the first physical address.

3. The memory management method according to claim 2, wherein the step of determining whether the data status corresponding to the first physical address in the physical address status table needs to be updated according to the physical-to-logical address mapping table, the logical address status table, and the first physical address comprises:
    identifying a first logical address mapping to the first physical address according to the physical-to-logical address mapping table;
    comparing the data status corresponding to the first logical address in the logical address status table and the data status corresponding to the first physical address in the physical address status table according to the logical address status table and the first logical address; and
    if the data status corresponding to the first logical address in the logical address status table is different from the data status corresponding to the first physical address in the physical address status table, determining the data status corresponding to the first physical address in the physical address status table needs to be updated, and adjusting the data status corresponding to the first physical address in the physical address status table from the first state to the data status corresponding to the first logical address in the logical address status table, wherein the data status corresponding to the first logical address in the logical address status table is the second state.

4. The memory management method according to claim 2, wherein the step of selecting the first physical address having the first state as the data status from the plurality of physical addresses reflected by the physical address status table according to the physical address status table if the predetermined condition is met comprises:
    sequentially determining the data status of the plurality of physical addresses in an order from the oldest to the newest according to the reflected plurality of physical addresses and time of the data status corresponding to the plurality of physical addresses respectively; and
    selecting a physical address having the first state as the data status as the first physical address.

5. The memory management method according to claim 1, further comprising:
    determining that the predetermined condition is met if the host system is idle, is performing a garbage collection operation, or has resources for performing an operation of updating the physical address status table.

6. The memory management method according to claim 1, wherein the logical address status table reflects a plurality of logical addresses of the plurality of logical units and the data status corresponding to the plurality of logical addresses, wherein data stored in a logical unit corresponding to a logical address having the first state as the data status is valid, and data stored in a logical unit corresponding to a logical address having the second state as the data status is invalid,
    wherein the physical address status table reflects a plurality of physical addresses of the plurality of physical programming units and the data status corresponding to the plurality of physical addresses, wherein data stored in a physical programming unit corresponding to a physical address having the first state as the data status is valid, and data stored in a physical programming unit corresponding to a physical address having the second state as the data status is invalid.

7. The memory management method according to claim 6, wherein the step of performing erasing to the at least one invalid data according to the updated physical address status table comprises:
identifying at least one second physical address having the second state as the data status and at least one third physical address having the first state as the data status in the updated physical address status table according to the updated physical address status table; and
executing a garbage collection operation according to the at least one second physical address and the at least one third physical address, wherein the step of executing the garbage collection operation according to the at least one second physical address and the at least one third physical address comprises:
collecting at least one valid data stored in the at least one third physical address; and
erasing at least one invalid data stored in the at least one second physical address.

8. The memory management method according to claim 1, further comprising:
assigning at least one physical unit having at least one physical programming unit storing valid data into a data link, wherein the data link is disposed with the physical address status table, wherein the physical address status table is configured to reflect a physical address of each of a plurality of physical programming units of the at least one physical unit and the data status of the data stored in each of the plurality of physical programming units of the at least one physical unit,
wherein the step of updating the physical address status table according to the comparison result of the logical address status table and the physical address status table if the predetermined condition is met comprises:
checking the at least one physical unit of the data link in a predetermined order through the physical address status table.

9. The memory management method according to claim 8, wherein the step of checking the at least one physical unit of the data link in the predetermined order through the physical address status table comprises:
sequentially checking the plurality of physical addresses and the corresponding data statuses reflected by the physical address status table in the predetermined order, so as to identify a plurality of physical addresses having the first state as the data status in the physical address status table; and
selecting at least one physical address from the plurality of physical addresses having the first state as the data status, and comparing the data status of at least one logical address in the logical address status table and the data status of the at least one physical address according to the at least one physical address and the at least one logical address mapping to the at least one physical address.

10. A memory control circuit unit for controlling a memory storage device, comprising:
a host interface, coupled to a host system;
a memory interface, coupled to a rewritable non-volatile memory module, wherein the rewritable non-volatile memory module comprises a plurality of physical erasing units, wherein each of the plurality of physical erasing units has a plurality of physical programming units, wherein the plurality of physical programming units are mapping to a plurality of logical units;
a memory management circuit, coupled to the host interface and the memory interface, wherein the memory management circuit is configured to receive an adjust command from the host system, wherein the adjust command is configured to indicate that data stored in at least one logical unit among the plurality of logical units is invalid,
wherein the memory management circuit is further configured to update a logical address status table according to the adjust command, wherein the logical address status table is configured to reflect a data status of the data stored in each of the plurality of logical units, wherein the data status comprises a first state or a second state,
wherein the memory management circuit is further configured to update a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units,
wherein the memory management circuit is further configured to perform erasing to at least one invalid data according to the updated physical address status table,
wherein during the operation of the memory management circuit being further configured to update the physical address status table according to the comparison result of the logical address status table and the physical address status table if the predetermined condition is met,
the memory management circuit selects a first physical address having the first state as the data status from a plurality of physical addresses reflected by the physical address status table according to the physical address status table if the predetermined condition is met,
wherein the memory management circuit determines whether the data status corresponding to the first physical address in the physical address status table needs to be updated according to the first physical address.

11. The memory control circuit unit according to claim 10, wherein during the operation of the memory management circuit determines whether the data status corresponding to the first physical address in the physical address status table needs to be updated according to the physical address,
the memory management circuit determines whether the data status corresponding to the first physical address in the physical address status table needs to be updated according to a physical-to-logical address mapping table, the logical address status table, and the first physical address.

12. The memory control circuit unit according to claim 11, wherein during the operation of the memory management circuit determines whether the data status corresponding to the first physical address in the physical address status table needs to be updated according to the physical-to-logical address mapping table, the logical address status table, and the first physical address, the memory management circuit identifies a first logical address mapping to the first physical address according to the physical-to-logical address mapping table, wherein the memory management circuit compares the data status corresponding to the first logical address in the logical address status table and the data status corresponding to the first physical address in the physical address status table according to the logical address status table and the first logical address, wherein if the data status corresponding to the first logical address in the logical address status table is different from the data status corresponding to the first physical address in the physical address status table, the memory management circuit determines that the data status corresponding to the first physical address in the physical address status table needs to be updated, and adjusts the data status corresponding to the first physical address in the physical address status table from the first state to the data status corresponding to the first logical address in the logical address status table, wherein the data status corresponding to the first logical address in the logical address status table is the second state.

13. The memory control circuit unit according to claim 11, wherein during the operation of the memory management circuit selecting the first physical address having the first state as the data status from the plurality of physical addresses reflected by the physical address status table according to the physical address status table if the predetermined condition is met, the memory management circuit sequentially determines the data status of the plurality of physical addresses in an order from the oldest to the newest according to the reflected plurality of physical addresses and time of the data status corresponding to the plurality of physical addresses respectively, and the memory management circuit selects a physical address having the first state as the data status as the first physical address.

14. The memory control circuit unit according to claim 10, wherein the memory management circuit determines that the predetermined condition is met if the host system is idle, is performing a garbage collection operation, or has resources for performing an operation of updating the physical address status table.

15. The memory control circuit unit according to claim 10, wherein the logical address status table reflects a plurality of logical addresses of the plurality of logical units and the data status corresponding to the plurality of logical addresses, wherein data stored in a logical unit corresponding to a logical address having the first state as the data status is valid, and data stored in a logical unit corresponding to a logical address having the second state as the data status is invalid, wherein the physical address status table reflects a plurality of physical addresses of the plurality of physical programming units and the data status corresponding to the plurality of physical addresses, wherein data stored in a physical programming unit corresponding to a physical address having the first state as the data status is valid, and data stored in a physical programming unit corresponding to a physical address having the second state as the data status is invalid.

16. The memory control circuit unit according to claim 15, wherein during the operation of the memory management circuit being further configured to perform erasing to the at least one invalid data according to the updated physical address status table, the memory management circuit identifies at least one second physical address having the second state as the data status and at least one third physical address having the first state as the data status in the updated physical address status table according to the updated physical address status table, wherein the memory management circuit executes a garbage collection operation according to the at least one second physical address and the at least one third physical address, wherein during the operation of the memory management circuit executing the garbage collection operation according to the at least one second physical address and the at least one third physical address, the memory management circuit collects at least one valid data stored in the at least one third physical address; and the memory management circuit erases at least one invalid data stored in the at least one second physical address.

17. The memory control circuit unit according to claim 10, wherein the memory management circuit assigns at least one physical unit having at least one physical programming unit storing valid data into a data link, wherein the data link is disposed with the physical address status table, wherein the physical address status table is configured to reflect a physical address of each of a plurality of physical programming units of the at least one physical unit and the data status of the data stored in each of the plurality of physical programming units of the at least one physical unit, wherein during the operation of the memory management circuit being further configured to update the physical address status table according to the comparison result of the logical address status table and the physical address status table if the predetermined condition is met, the memory management circuit checks the at least one physical unit of the data link in a predetermined order through the physical address status table.

18. The memory control circuit unit according to claim 17, wherein during the operation of the memory management circuit checking the at least one physical unit of the data link in the predetermined order through the physical address status table, the memory management circuit sequentially checks the plurality of physical addresses and the corresponding data statuses reflected by the physical address status table in the predetermined order, so as to identify a plurality of physical addresses having the first state as the data status in the physical address status table, wherein the memory management circuit selects at least one physical address from the plurality of physical addresses having the first state as the data status, and compares the data status of at least one logical address in the logical address status table and the data status of the at least one physical address according to the at least one physical address and the at least one logical address mapping to the at least one physical address.

19. A memory storage device comprising:

a connection interface unit, configured to couple to a host system;

a rewritable non-volatile memory module comprising a plurality of physical erasing units, wherein each of the plurality of physical erasing units has a plurality of physical programming units, wherein the plurality of physical programming units are mapping to a plurality of logical units; and a memory control circuit unit, coupled to the connection interface unit and the rewritable non-volatile memory module, wherein the memory control circuit unit is configured to receive an adjust command from the host system, wherein the adjust command is configured to indicate that data stored in at least one logical unit among the plurality of logical units is invalid, wherein the memory control circuit unit is further configured to update a logical address status table according to the adjust command, wherein the logical address status table is configured to reflect a data status of the data stored in each of the plurality of logical units, wherein the data status comprises a first state or a second state, wherein the memory control circuit unit is further configured to update a physical address status table according to a comparison result of the logical address status table and the physical address status table if a predetermined condition is met, wherein the physical address status table is configured to reflect the data status of data stored in each of a plurality of physical programming units corresponding to the physical address status table among the plurality of physical programming units, wherein the memory control circuit unit is further configured to perform erasing to at least one invalid data according to the updated physical address status table, wherein during the operation of the memory control circuit unit being further configured to update the physical address status table according to the comparison result of the logical address status table and the physical address status table if the predetermined condition is met, the memory control circuit unit selects a first physical address having the first state as the data status from a plurality of physical addresses reflected by the physical address status table according to the physical address status table if the predetermined condition is met, wherein the memory control circuit unit determines whether the data status corresponding to the first physical address in the physical address status table needs to be updated according to the first physical address.

20. The memory storage device according to claim 19, wherein during the operation of the memory control circuit unit determines whether the data status corresponding to the first physical address in the physical address status table needs to be updated according to the first physical address, the memory control circuit unit determines whether the data status corresponding to the first physical address in the physical address status table needs to be updated according to a physical-to-logical address mapping table, the logical address status table, and the first physical address.

21. The memory storage device according to claim 20, wherein during the operation of the memory control circuit unit determines whether the data status corresponding to the first physical address in the physical address status table needs to be updated according to the physical-to-logical address mapping table, the logical address status table, and the first physical address, the memory control circuit unit identifies a first logical address mapping to the first physical address according to the physical-to-logical address mapping table, wherein the memory control circuit unit compares the data status corresponding to the first logical address in the logical address status table and the data status corresponding to the first physical address in the physical address status table according to the logical address status table and the first logical address, wherein if the data status corresponding to the first logical address in the logical address status table is different from the data status corresponding to the first physical address in the physical address status table, the memory control circuit unit determines that the data status corresponding to the first physical address in the physical address status table needs to be updated, and adjusts the data status corresponding to the first physical address in the physical address status table from the first state to the data status corresponding to the first logical address in the logical address status table, wherein the data status corresponding to the first logical address in the logical address status table is the second state.

22. The memory storage device according to claim 20, wherein during the operation of the memory control circuit unit selecting the first physical address having the first state as the data status from the plurality of physical addresses reflected by the physical address status table according to the physical address status table if the predetermined condition is met, the memory control circuit unit sequentially determines the data status of the plurality of physical addresses in an order from the oldest to the newest according to the reflected plurality of physical addresses and time of the data status corresponding to the plurality of physical addresses respectively, and the memory control circuit unit selects a physical address having the first state as the data status as the first physical address.

23. The memory storage device according to claim 19, wherein the memory control circuit unit determines that the predetermined condition is met if the host system is idle, is performing a garbage collection operation, or has resources for performing an operation of updating the physical address status table.

24. The memory storage device according to claim 19, wherein the logical address status table reflects a plurality of logical addresses of the plurality of logical units and the data status corresponding to the plurality of logical addresses, wherein data stored in a logical unit corresponding to a logical address having the first state as the data status is valid, and data stored in a logical unit corresponding to a logical address having the second state as the data status is invalid, wherein the physical address status table reflects a plurality of physical addresses of the plurality of physical programming units and the data status corresponding to the plurality of physical addresses, wherein data stored in a physical programming unit corresponding to a physical address having the first state as the data status is valid, and data stored in a physical programming unit corresponding to a physical address having the second state as the data status is invalid.

25. The memory storage device according to claim 24, wherein during the operation of the memory control circuit unit being further configured to perform erasing to the at least one invalid data according to the updated physical address status table, the memory control circuit unit identifies at least one second physical address having the second state as the data status and at least one third physical address having the first state as the data status in the updated physical address status table according to the updated physical address status table, wherein the memory control circuit unit executes a garbage collection operation according to the at least one second physical address and the at least one third physical address, wherein during the operation of the memory control circuit unit executing the garbage collection operation according to the at least one second physical address and the at least one third physical address, the memory control circuit unit collects at least one valid data stored in the at least one third physical address; and the memory control circuit unit erases at least one invalid data stored in the at least one second physical address.

26. The memory storage device according to claim 19, wherein the memory control circuit unit assigns at least one physical unit having at least one physical programming unit storing valid data into a data link, wherein the data link is disposed with the physical address status table, wherein the physical address status table is configured to reflect a physical address of each of a plurality of physical programming units of the at least one physical unit and the data status of the data stored in each of the plurality of physical programming units of the at least one physical unit, wherein during the operation of the memory control circuit unit being further configured to update the physical address status table according to the comparison result of the logical address status table and the physical address status table if the predetermined condition is met, the memory control circuit unit checks the at least one physical unit of the data link in a predetermined order through the physical address status table.

27. The memory storage device according to claim 26, wherein during the operation of the memory control circuit unit checking the at least one physical unit of the data link in the predetermined order through the physical address status table, the memory control circuit unit sequentially checks the plurality of physical addresses and the corresponding data statuses reflected by the physical address status table in the predetermined order, so as to identify a plurality of physical addresses having the first state as the data status in the physical address status table, wherein the memory control circuit unit selects at least one physical address from the plurality of physical addresses having the first state as the data status, and compares the data status of at least one logical address in the logical address status table and the data status of the at least one physical address according to the at least one physical address and the at least one logical address mapping to the at least one physical address.

\* \* \* \* \*